(12) United States Patent
Katou

(10) Patent No.: US 8,998,419 B2
(45) Date of Patent: Apr. 7, 2015

(54) ILLUMINATING DEVICE AND PROJECTION DISPLAY DEVICE USING THE SAME

(75) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 446 days.

(21) Appl. No.: 13/390,917

(22) PCT Filed: Aug. 21, 2009

(86) PCT No.: PCT/JP2009/064645
§ 371 (c)(1),
(2), (4) Date: Feb. 16, 2012

(87) PCT Pub. No.: WO2011/021304
PCT Pub. Date: Feb. 24, 2011

(65) Prior Publication Data
US 2012/0147330 A1 Jun. 14, 2012

(51) Int. Cl.
*G03B 21/14* (2006.01)
*G03B 21/20* (2006.01)

(52) U.S. Cl.
CPC ............ *G03B 21/14* (2013.01); *G03B 21/2073* (2013.01)

(58) Field of Classification Search
CPC ..... G02B 20/283; G02B 27/28; G02B 27/283
USPC .......................................................... 353/30
See application file for complete search history.

(56) References Cited

U.S. PATENT DOCUMENTS 6,910,772 B2 * 6/2005 Yano ............................... 353/20
7,346,236 B2 3/2008 Asano et al.
(Continued)

FOREIGN PATENT DOCUMENTS

CN 1387057 A 12/2002
CN 101371070 A 2/2009
(Continued)

OTHER PUBLICATIONS

International Search Report in PCT/JP2009/064645 dated Sep. 15, 2009 (English translation thereof).
(Continued)

*Primary Examiner* — Georgia Epps
*Assistant Examiner* — Jerry Brooks
(74) *Attorney, Agent, or Firm* — McGinn IP Law Group, PLLC

(57) ABSTRACT

Provided is an illuminating device that includes: first light guiding means (3) where light incident from one end surface is propagated inside to exit from the other end surface; illuminating optical system (1) that spatially separates a luminous flux from the other end surface of first light guiding means (3) into a plurality of luminous fluxes, and forms an optical image formed on the other end surface of first light guiding means (3) on display element (12); reflective polarizing plate (11) that is located between illuminating optical system (1) and display element (12), and transmits first polarized light while reflecting second polarized light different that is in polarized state from the first polarized light toward illuminating optical system (1); reflecting element (7) that is disposed at a position where the plurality of luminous fluxes are spatially separated, and that includes transmission regions through which the plurality of luminous fluxes are transmitted, and a reflecting film formed in a region other than the transmission regions to reflect light reflected by reflective polarizing plate (11) toward reflective polarizing plate (11); and phase plate (10) located between reflecting element (7) and reflective polarizing plate (11).

20 Claims, 12 Drawing Sheets

(56) References Cited

U.S. PATENT DOCUMENTS

| | | | |
|---|---|---|---|
| 7,872,219 B2 | 1/2011 | Shimaoka et al. | |
| 2001/0033367 A1* | 10/2001 | Karasawa et al. | 353/30 |
| 2003/0002151 A1 | 1/2003 | Yano | |
| 2005/0146691 A1 | 7/2005 | Yano | |
| 2005/0225728 A1 | 10/2005 | Yano | |
| 2006/0077353 A1 | 4/2006 | Wu | |
| 2006/0078266 A1 | 4/2006 | Wu et al. | |
| 2007/0002280 A1 | 1/2007 | Furusawa et al. | |
| 2010/0045937 A1* | 2/2010 | Li | 353/31 |
| 2010/0165300 A1 | 7/2010 | Shimaoka et al. | |

FOREIGN PATENT DOCUMENTS

| | | | |
|---|---|---|---|
| JP | 2000-206464 A | 7/2000 | |
| JP | 2001-100314 A | 4/2001 | |
| JP | 2001-324762 A | 11/2001 | |
| JP | 2002-328430 A | 11/2002 | |
| JP | 2006-106682 A | 4/2006 | |
| JP | 2006-106683 A | 4/2006 | |
| JP | 2006-337425 A | 12/2006 | |
| JP | 2007-011179 A | 1/2007 | |
| JP | 2008-70529 A | 3/2008 | |
| JP | 2009-00444 A * | 8/2009 | G03B 21/14 |
| WO | WO 2007/083678 A1 | 7/2007 | |
| WO | WO2007/083678 A1 | 7/2007 | |

OTHER PUBLICATIONS

Hans Zou, et al., "Single-Panel LCOS Color Projector with LED Light Sources", SID 05 Digest, pp. 1698-1701 2005.

O.H. Willemsen, et al., "A Handheld Mini-Projector Using LED Light Sources", SID 05 Digest, pp. 1706-1709, 2005.

Juan Manuel Teijido, et al., "73.2: Distinguished Paper: Compact Three Panel LED Projector Engine for Portable Applications", SID 06 Digest, pp. 2011-2014, 2006.

Chinese Office Action dated Feb. 11, 2014, with English translation.

Japanese Office Action dated Apr. 2, 2013 with partial English translation thereof.

* cited by examiner

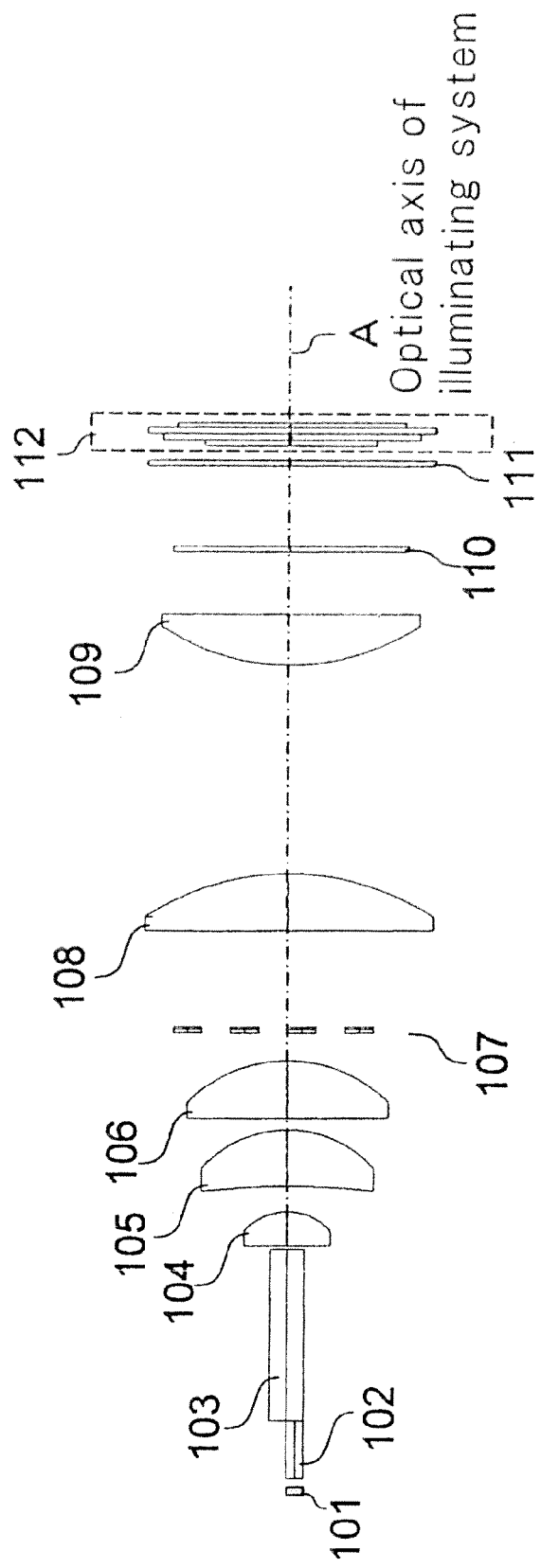

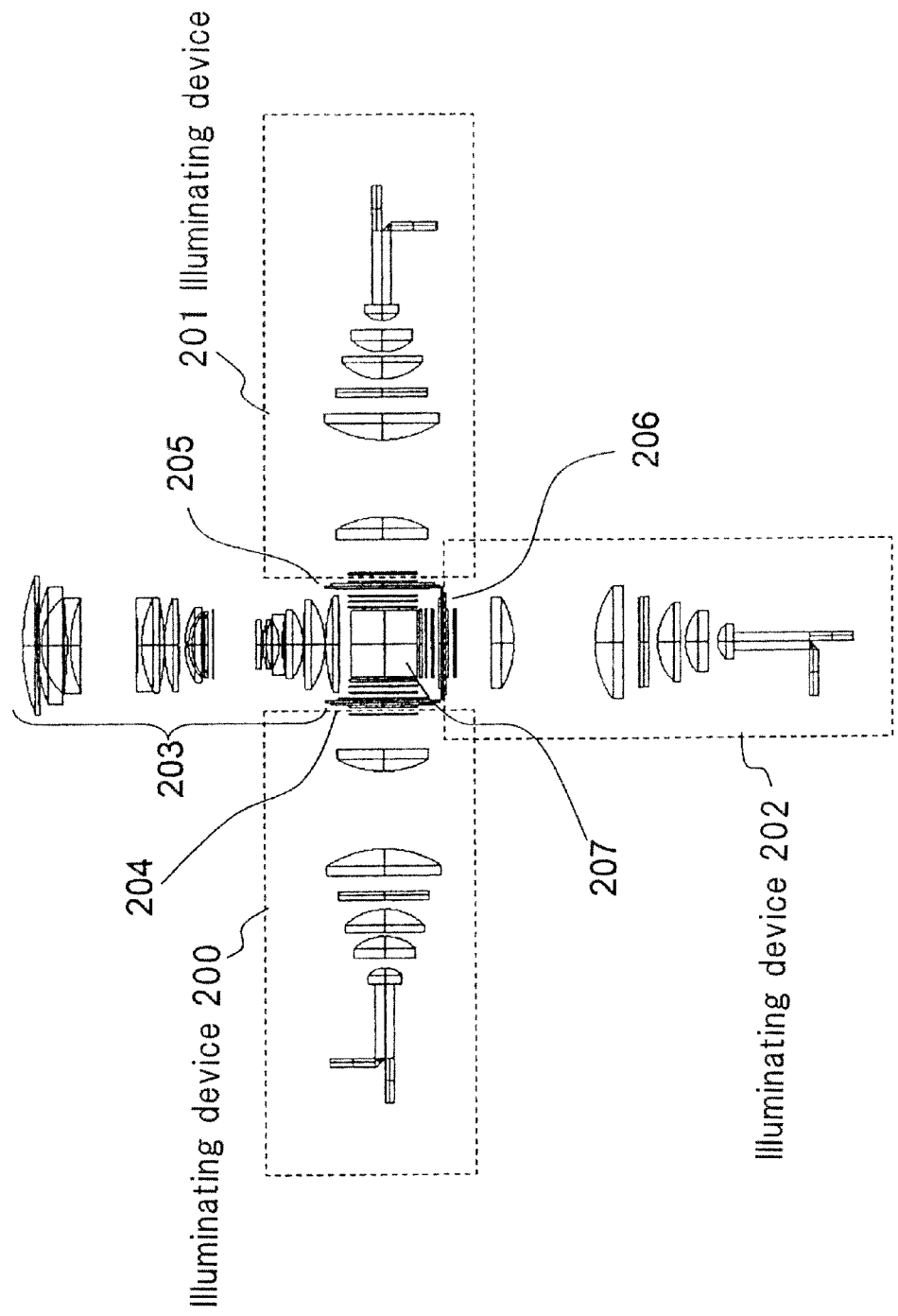

ILLUMINATING DEVICE AND PROJECTION DISPLAY DEVICE USING THE SAME

TECHNICAL FIELD

The present invention relates to an illuminating device of a projection display device represented by a liquid crystal projector, and more particularly to an illuminating device that illuminates a display element including a conversion element.

BACKGROUND ART

Patent Literatures 1 and 2 discuss a projector that uses a LED (Light Emitting Diode) as a light source for illuminating a DMD (Digital Micromirror Device) serving as a display element (Patent Literatures 1 and 2). The projector of this type is expected to reduce costs more than a projector that uses a white discharge lamp, and achieve performance including miniaturization, lower power consumption, and a wider color reproduction range.

There are also a projector that uses a single LCoS (Liquid Crystal on Silicon) element (Nonpatent Literature 1), and a projector that users three liquid crystal panels as display elements (Nonpatent Literatures 2 and 3).

In the liquid crystal projector, usually, a liquid crystal panel must be illuminated with polarized light. Generally, light from the LED is unpolarized light. Thus, when the LED is used as a light source for illuminating the liquid crystal panel, it is preferable that the light from the LED be converted into polarized light to increase light use efficiency.

For example, when a display panel is a TN liquid crystal (Twisted Nematic Liquid Crystal) panel, with respect to the unpolarized light from the LED which includes two linear polarized components which are orthogonal each other, one of linear polarized component is converted to be similar to the other polarized component. When efficiency of this polarizing conversion is low, the light use efficiency declines. When no polarizing conversion is carried out, about a half of the light is not used as illumination light.

In the projector described in Nonpatent Literature 1, a luminous flux from the LED that is the light source is roughly converted into parallel luminous fluxes by a light guiding member having a composite paraboloidal surface shape, which is referred to as a CPC reflector. The display panel is illuminated with the parallel luminous fluxes from the light guiding member.

A ¼ wavelength plate and a reflective polarizing plate are located in a traveling direction of the luminous flux from the light guiding member. For example, the polarizing plate transmits p-polarized light while reflecting s-polarized light. The s-polarized light reflected by the polarizing plate passes through the ¼ wavelength plate. The light (circular polarized light) passed through the ¼ wavelength plate returns to the LED to be reflected on a surface of the LED. The light reflected on the surface of the LED is converted parallel by the light guiding member, and then passes through the ¼ wavelength plate again.

A portion of the s-polarized light reflected by the polarizing plate, which has passed through the ¼ wavelength plate twice in the returning process to the LED and in the process of being reflected on the surface of the LED to travel toward the polarizing plate, is converted into p-polarized light.

In addition, there is an illuminating device discussed in Patent Literature 3. This illuminating device includes: a light source; a glass rod one end surface of which light from the light source enters; condensing means for condensing a luminous flux that has exited from the other end surface of the glass rod; and a PBS (Polarizing Beam Splitter) polarizing conversion array disposed at a position where the condensing means forms a plurality of light source images.

The PBS polarizing conversion array is formed by alternately arranging a first prism that includes a polarizing separation film formed to transmit the p-polarized light while reflecting the s-polarized light and a second prism that includes a reflecting film formed to reflect the light reflected by the polarizing separation film of the first prism in a traveling direction of the p-polarized light transmitted by the polarizing separation film. A ½ wavelength plate for converting the s-polarized light into p-polarized light is formed in an exit surface of the second prism. A light shielding plate is formed in a surface opposite the exit surface of the second prism. The condensing means is configured to form a light source image on an incident surface of the first prism.

CITATION LIST

Patent Literature

Patent Literature 1: JP2006-106683A
Patent Literature 2: JP2006-106682A
Patent Literature 3: JP2000-206464A

Nonpatent Literature

Nonpatent Literature 1: pp. 1698 to 1701, "Single-Panel LCoS Color Projector with LED Light Source" SID 05 DIGEST
Nonpatent Literature 2: pp. 1706 to 1709, "A Handheld Mini-Projector Using LED Light Sources" SID 05 DIGEST
Nonpatent Literature 3: pp. 2011 to 2014, "Compact Three Panel LED Projector Engine for Portable Applications" SID 06 DIGEST

SUMMARY OF INVENTION

However, the projector described in Nonpatent Literature 1 has the following problem.

The light of the polarized component reflected by the reflective polarizing plate efficiently returns to the surface of the LED. However, on the surface of the LED, only a part of the returned light is reflected toward the polarizing plate. In this way, a light loss occurs on the surface of the LED, thus preventing realization of high polarizing conversion efficiency. For example, it has been reported that polarizing conversion efficiency (gain) is about 1.2 due to the light loss on the surface of the LED.

The illuminating device described in Patent Literature 1 is difficult to be miniaturized because of the use of the PBS polarizing conversion array. For example, recent miniaturization of the display panel may require a pitch of each prism of the PBS polarizing conversion array to be about 1 millimeter. When the first and second prisms are formed at such pitches, it is difficult to attach the ½ wavelength plate to the second prism.

In the future, the display panel is expected to be further miniaturized. Thus, the problem of miniaturization in the illuminating device that uses the PBS polarizing conversion array will become more prominent.

It is an object of the present invention to provide a compact illuminating device capable of increasing light use efficiency by improving polarizing conversion efficiency, which can solve the above mentioned problems, and a projection display device that uses the same.

Solution to Problems

To achieve this object, an illuminating device according to the present invention includes:

a light source;

first light guiding means where light from the light source is supplied to one end surface, and light incident from the one end surface is propagated inside to exit from the other end surface;

an illuminating optical system that spatially separates a luminous flux output from the other end surface of the first light guiding means into a plurality of luminous fluxes and that forms, on a display element, an optical image formed on the other end surface of the first light guiding means;

a reflective polarizing plate that is located between the illuminating optical system and the display element and that transmits first polarized light while reflecting second polarized light different in polarized state from the first polarized light toward the illuminating optical system;

a reflecting element that is disposed at a position where the plurality of luminous fluxes are spatially separated and that reflects light reflected by the reflective polarizing plate toward the reflective polarizing plate; and a phase plate that is located between the reflecting element and the reflective polarizing plate.

In this case, the reflecting element includes transmission regions through which the plurality of luminous fluxes are transmitted, and a reflecting film that is formed in a region other than the transmission regions to reflect the light from the reflective polarizing plate.

A projection display device according to the present invention includes:

an illuminating device;

a display element illuminated with light from the illuminating device; and a projection optical system that projects image light from the display element.

In this case, the illuminating device includes:

a light source;

light guiding means where light from the light source is supplied to one end surface, and light incident from the one end surface is propagated inside to exit from the other end surface;

an illuminating optical system that spatially separates a luminous flux output from the other end surface of the light guiding means into a plurality of luminous fluxes and that forms, on the display element, an optical image formed on the other end surface of the light guiding means;

a reflective polarizing plate that is located between the illuminating optical system and the display element and that transmits first polarized light while reflecting second polarized light different in polarized state from the first polarized light toward the illuminating optical system;

a reflecting element that is disposed at a position where the plurality of luminous fluxes are spatially separated and that reflects light reflected by the reflective polarizing plate toward the reflective polarizing plate; and a phase plate that is located between the reflecting element and the reflective polarizing plate; and the reflecting element includes transmission regions through which the plurality of luminous fluxes are transmitted, and a reflecting film that is formed in a region other than the transmission regions to reflect the light from the reflective polarizing plate.

BRIEF DESCRIPTION OF DRAWINGS

FIG. 1 is a schematic view showing a configuration of an illuminating device according to a first exemplary embodiment of the present invention.

FIG. 14 is a schematic view showing a configuration of a projection display device that includes the illuminating device according to the present invention.

Figure 2A:
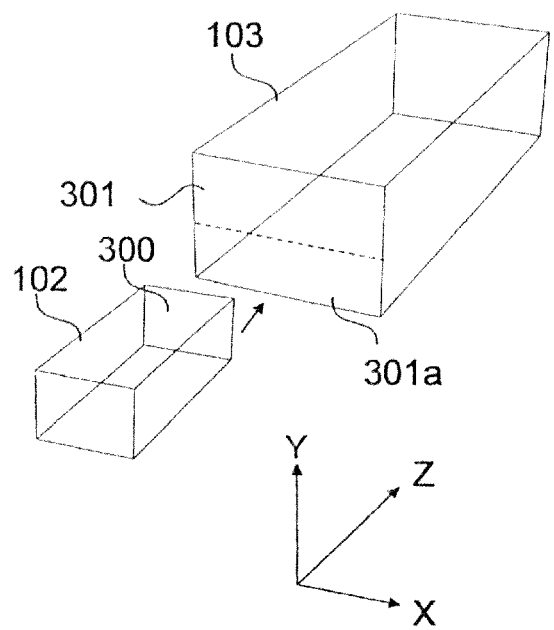
FIG. 2A is a schematic view showing a configuration of each light guiding rod of the illuminating device shown in FIG. 1.

EXPLANATION OF REFERENCE NUMERALS 1 illuminating optical system
3 light guiding means
4 to 6, 8, 9 illumination lens
7 reflecting element
10 phase plate
11 reflective polarizing plate
12 display element

DESCRIPTION OF EMBODIMENTS

Next, exemplary embodiments of the present invention are described with reference to the accompanying drawings.

First Exemplary Embodiment

FIG. 1 is a schematic view showing a configuration of an illuminating device according to a first exemplary embodiment of the present invention.

As shown in FIG. 1, the illuminating device according to the present embodiment, which illuminates display element 112 having reflective polarizing plate 111, includes, in addition to reflective polarizing plate 111, light source 101, light guiding rods 102 and 103, illumination lenses 104, 105, 106, 108, and 109, reflecting element 107, and phase plate 110.

Reflective polarizing plate 111 is, for example, a polarizing plate of a wire-grid type, and configured to transmit, among incident lights, first polarized light (e.g., p-polarized light) while reflecting second polarized light (e.g., s-polarized light) different from the first polarized light in a direction (toward reflecting element 7) opposite an incident direction.

Display element 112 includes, for example, a liquid crystal panel. For both reflective polarizing plate 111 and display element 112, commercially available products can be used. As display element 112, for example, a transmissive liquid crystal panel having a diagonal of 1.0 inch can be used.

It is preferable that reflective polarizing plate 111 be located near a display surface (panel surface) of display element 112. Reflective polarizing plate 111 can be formed integrally with display element 112. For example, when the liquid crystal panel is used as display element 112, reflective polarizing plate 111 can be formed integrally with a substrate of an incident side of the liquid crystal panel.

Light source 101 is a solid light source represented by, for example, a LED. Light from light source 101 is supplied to one end surface (incident surface) of light guiding rod 102. Light guiding rod 102 is configured to make uniform luminance of the light from light source 101. The incident surface is roughly similar in area and shape to a light emitting part of light source 101.

For example, when a LED having a rectangular light emitting part is used as light source 101, a shape of the incident surface of light guiding rod 102 is rectangular, and its area is roughly equal to that of the light emitting part of the LED. More specifically, when a LED having a light emitting part of 4 mm×3 mm is used, the incident surface of light guiding rod 102 is 4 mm×3 mm in size. Light guiding rod 102 has a length of about 10 millimeters. A high-luminance LED that provides a large light output is commercially available. The LED having the light emitting part of 4 mm×3 mm can be easily obtained. To enter a greater amount of light from the LED to light guiding rod 102, it is preferred that the distance between the light emitting part of the LED and light guiding rod 102 be set as small as possible. Specifically, the distance between light guiding rod 102 and the LED is 0.7 millimeters.

The other end surface (exit surface) of light guiding rod 102 is optically coupled with one end surface (incident surface) of light guiding rod 103 larger in area than the end surface. The optical coupling signifies that light guiding rods 102 and 103 are optically coupled so that most of light from the exit surface of light guiding rod 102 can enter the incident surface of light guiding rod 103.

Light guiding rod 102 has a sectional size of, for example, 8 mm×6 mm, and a length of 30 millimeters. In other words, light guiding rod 103 is longer than light guiding rod 102.

Optically coupling light guiding rods 102 and 103 can suppress generation of light losses on an interface between light guiding rods 102 and 103.

Light guiding rods 102 and 103 can be formed by using an inexpensively available BK7 made of glass. As materials for light guiding rods 102 and 103, optical glasses or optical plastics can be used. Light guiding rods 102 and 103 can be hollow types where centers are cavities, or solid types that do not have any such cavities.

The exit surface of light guiding rod 102 and the incident surface of light guiding rod 103 are joined by optical lens adhesives. In the joined state, an axis (center axis) passing through a center (center of gravity) of a section of light guiding rod 102 and an axis passing through a center (center of gravity) of a section of light guiding rod 103 do not match each other. In other words, a light emitting center of light source 101 is not located on an optical axis (optical system A of illuminating system) of the entire system including light guiding rod 103 and illumination lenses 104, 105, 106, 108, and 109.

Figure 2B:
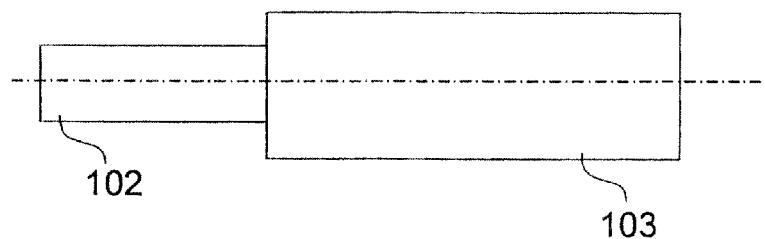
FIG. 2B is a top view showing the configuration of each light guiding rod of the illuminating device shown in FIG. 1.
Figure 2C:
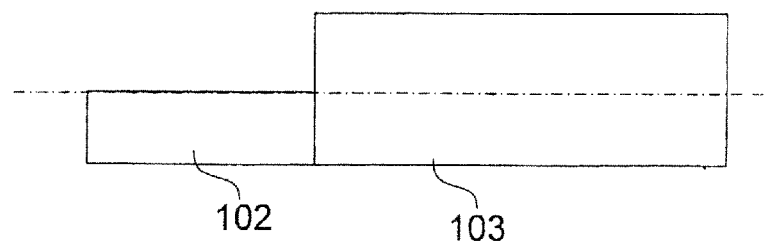
FIG. 2C is a side view showing the configuration of each light guiding rod of the illuminating device shown in FIG. 1.

FIG. 2A is a schematic view showing light guiding rods 102 and 103. FIG. 2B is a schematic view when joined light guiding rods 102 and 103 are seen from an upper surface side (Y direction), and FIG. 2C is a schematic diagram when joined light guiding rods 102 and 103 are seen from a side face (X direction).

As shown in FIG. 2A, each of light guiding rods 102 and 103 is a rectangular cross-section column. Exit surface 300 of light guiding rod 102 is smaller in area than incident surface 301 of light guiding rod 103.

Figure 3:
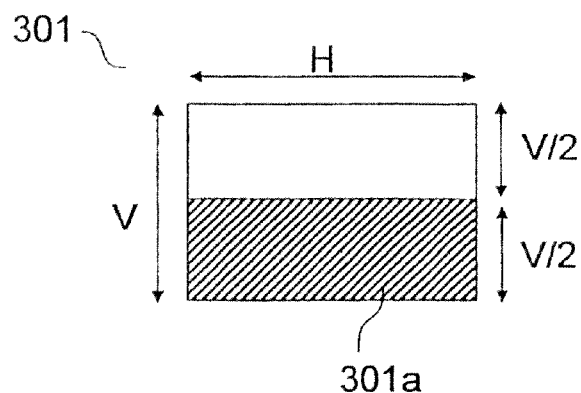
FIG. 3 is an explanatory schematic view showing a joining region of the light guiding rod of the illuminating device shown in FIG. 1.

Light guiding rods 102 and 103 are joined by the optical glass adhesives so that exit surface 300 of light guiding rod 102 can be housed in lower half region 301a of incident surface 301 of light guiding rod 103. For example, as shown in FIG. 3, when incident surface 301 of light guiding rod 103 has a size of H×V, it is preferred that exit surface 300 of light guiding rod 102 be joined in shaded region 301a (its size is (H×V)/2).

When joined light guiding rods 102 and 103 are seen from the upper surface side (Y direction) (refer to FIG. 2B), positions of optical axes of light guiding rods 102 and 103 look matched. When joined light guiding rods 102 and 103 are seen from the side face (X direction), the position of the optical axis of light guiding rod 102 is shifted in the Y direction with respect to that of the optical axis of light guiding rod 103.

Instead of using light guiding rod 102, for example, a lens system, in which light radiated from light source 101 is condensed and the condensed light is entered into region 301a of incident surface 301 of light guiding rod 103, can be used. In this case, the light emitting center of light source 101 is located on an optical axis of the lens system. However, the optical axis of the lens system does not match the optical axis A of the illuminating system that includes light guiding rod 103 and the illumination lens group. In other words, the light emitting center of light source 101 is not located on the optical axis A of the illuminating system, while the optical axis of the lens system is shifted in the Y direction with respect to the optical axis A of the illuminating system.

Illumination lenses 104, 105, and 106, reflecting element 107, illumination lenses 108 and 109, phase plate 110, reflective polarizing plate 111, and display element 112 are sequentially arranged in a traveling direction of light output from the other end surface (exit surface) of light guiding rod 103.

The center axis of light guiding rod 103 matches the optical axis of the illumination lens group including illumination lenses 104, 105, 106, 108, and 109. Centers (centers of gravity) of phase plate 110, reflective polarizing plate 111, and display element 112 are located on the optical axis A of the illumination system.

Illumination lenses 104, 105, 106, 108, and 109 all have spherical shapes in one surface or both surfaces. However, aspherical lenses can be used as illumination lenses 104, 105, 106, 108, and 109. An optical image formed on the exit surface of light guiding rod 103 is formed on the display surface of display element 112 by the illumination lens system including illumination lenses 104, 105, 106, 108, and 109.

A luminous flux output from the exit surface of light guiding rod 103 is spatially separated into a plurality of luminous fluxes by illumination lenses 104 to 106. The number of separated luminous fluxes is determined by the number of times of reflecting the light incident on light guiding rod 103 from light guiding rod 102 on its inner surface.

Reflecting element 107, which reflects light (e.g., s-polarized light) from reflective polarizing plate 111 toward reflective polarizing plate 111, is disposed at a position where the luminous flux from the exit surface of light guiding rod 103 is spatially separated. Specifically, reflecting element 107 is located between illumination lenses 106 and 108.

Figure 4:
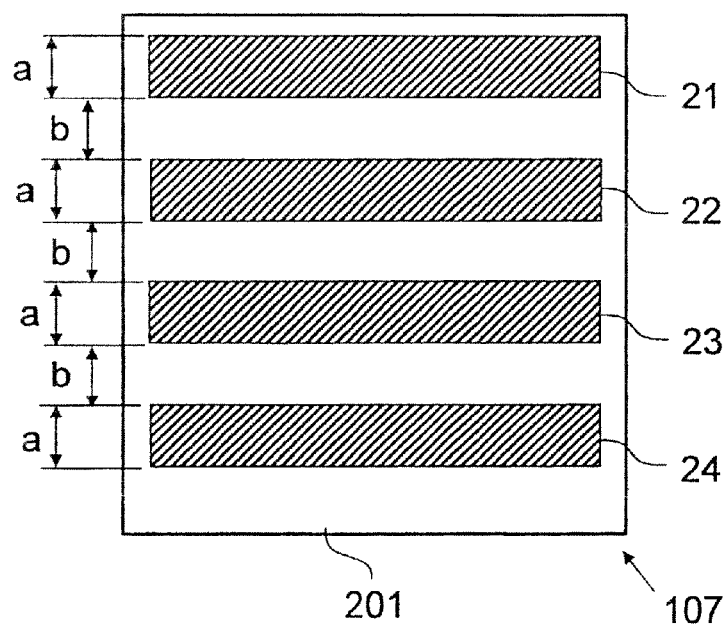
FIG. 4 is a schematic view showing a configuration of a reflecting element of the illuminating device shown in FIG. 1.

FIG. 4 is a schematic view showing reflecting element 107. Referring to FIG. 4, reflecting element 107 includes a plurality of belt-shaped reflecting films 21 to 24 formed on, for example, glass substrate 201, by aluminum deposition. Reflecting films 21 to 24 are formed in regions other than transmission regions through which the luminous fluxes separated by illumination lenses 104 to 106 are transmitted. Reflecting films 21 to 24 and the transmission regions are alternately arranged.

The width a of each of reflecting films 21 to 24 is about 5 millimeters. It is preferable that intervals b of reflecting films 21 to 24 be equal to or less than the width a. In the example shown in FIG. 4, the widths a and the intervals b of the reflecting films are uniform. However, they may not always be uniform.

Phase plate 110, which is a ¼ wavelength plate, is located between illumination lens 109 and reflective polarizing plate 111. The location of phase plate 110 is not limited between illumination lens 109 and reflective polarizing plate 111. Phase plate 110 can be located anywhere between reflecting element 107 and reflective polarizing plate 111.

In the illuminating device shown in FIG. 1, the illumination lens group includes five illumination lenses 104, 105, 106, 108, and 109. However, the number is not limited to five. The illumination lens group can take any lens configuration as long as the optical image formed on the exit surface of light guiding rod 103 can be formed on the display surface of display element 112. It is more preferable that optical parameters (curvature radius and interval) of illumination lenses 104, 105, 106, 108, and 109 be set to enable formation of the optical image formed on the exit surface of light guiding rod 103 on the display surface of display element 112, to enable spatial separation of the luminous flux from the exit surface of light guiding rod 103, and to enable returning, at the separation position of the luminous fluxes, of reflected light from reflective polarizing plate 111 to a region between the luminous fluxes.

Next, an operation of the illuminating device according to the present embodiment is described in detail.

Figure 5A:
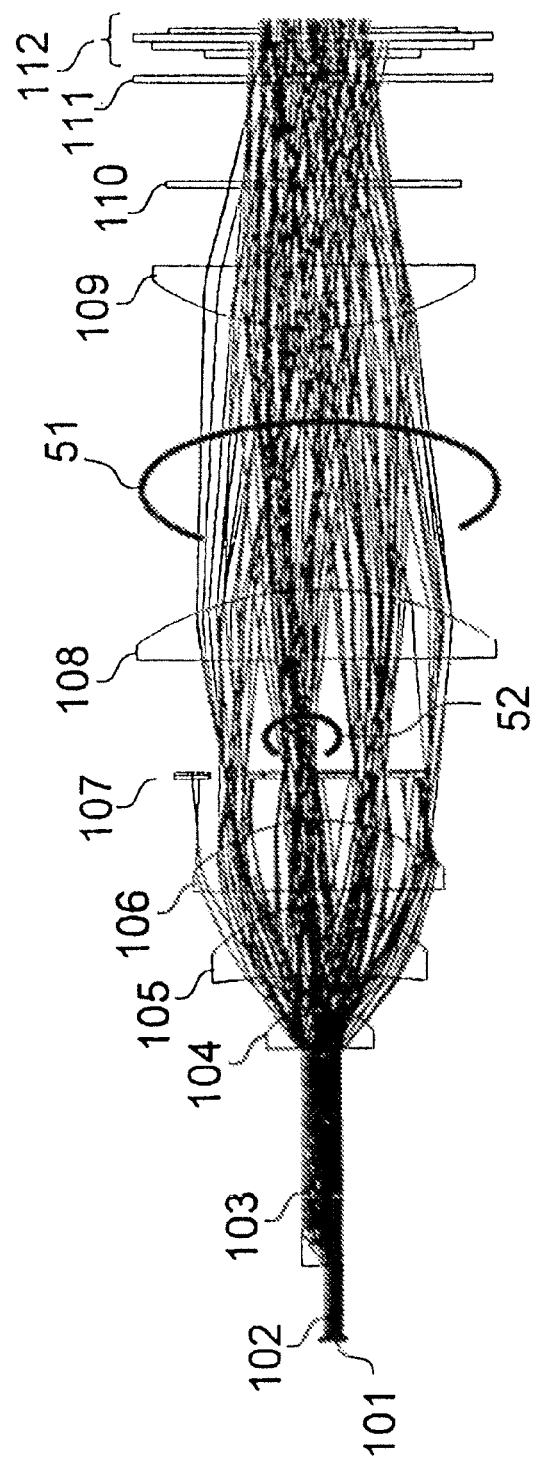
FIG. 5A is a schematic view showing a result of ray-tracing a process where a luminous flux from a light source reaches a display element in the illuminating device shown in FIG. 1.

FIG. 5A is a schematic view showing a result of ray-tracing a process where a luminous flux from light source 101 reaches display element 112 in the configuration shown in FIG. 1.

Referring to FIG. 5A, unpolarized light from light source 101 enters light guiding rod 101. In light guiding rod 102, the entered unpolarized light is repeatedly reflected on a rod inner surface to be propagated, and reaches the exit surface. During the propagation process in the rod, luminance is made uniform.

The unpolarized light from the exit surface of light guiding rod 102 enters the incident surface of light guiding rod 103. The exit surface of light guiding rod 102 is optically coupled into one (in the example shown in FIG. 5A, lower region) of two regions divided by a straight line passing through the center (center of gravity) of light guiding rod 103. Thus, the unpolarized light from light guiding rod 102 enters the lower half region of the incident surface of light guiding rod 103.

When there is luminance unevenness in the light emission of light source 101, through uniformization of luminance by light guiding rod 102, a uniform illuminance distribution is formed on the exit surface of light guiding rod 102. This is similar to a configuration where light sources uniform in luminance are arranged with zero space interval on the input end surface of light guiding rod 103. Thus, because there is no need to take luminance uniformization into consideration, the length of light guiding rod 103 can be set relatively small.

In light guiding rod 103, the incident unpolarized light is repeatedly reflected on a rod inner surface to be propagated, and reaches the exit surface. Illumination information (rectangular light source image) formed on the exit surface of light guiding rod 103 is formed on the display surface (panel surface) of the display element 112 by the illumination lens group including illumination lenses 104, 105, 106, 108, and 109.

A luminous flux of the unpolarized light output from the exit surface of light guiding rod 103 is spatially separated into a plurality of luminous fluxes by illumination lenses 104 to 106. The number of luminous fluxes separated by illumination lenses 104 to 106 is determined based on the number of reflecting times during the propagation process in light guiding rod 103.

Figure 5B:
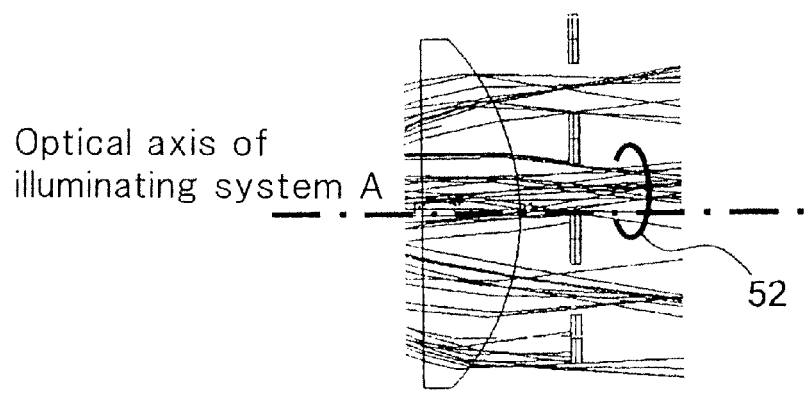
FIG. 5B is an enlarged view showing the vicinity of a separated luminous flux of a relatively small ray height among four luminous fluxes separated by an illumination lens of the illuminating device shown in FIG. 1.

In FIG. 5A, the light output from light guiding rod 103 is largely separated into four luminous fluxes. FIG. 5B is an enlarged view showing the vicinity of separated luminous flux 52 of a relatively small ray height among the four separated luminous fluxes.

As shown in FIG. 5B, separated luminous flux 52 is not located on the optical axis (optical axis A shown in FIG. 1) of the illuminating system including light guiding rod 103 and illumination lenses 104, 105, 106, 108, and 109. The reason for this is because the light from the exit surface of light guiding rod 102 enters the lower half region of the incident surface of light guiding rod 103, and hence separated luminous flux 52 is displaced above the position of the optical axis of the illumination system to be magnified.

Figure 6:
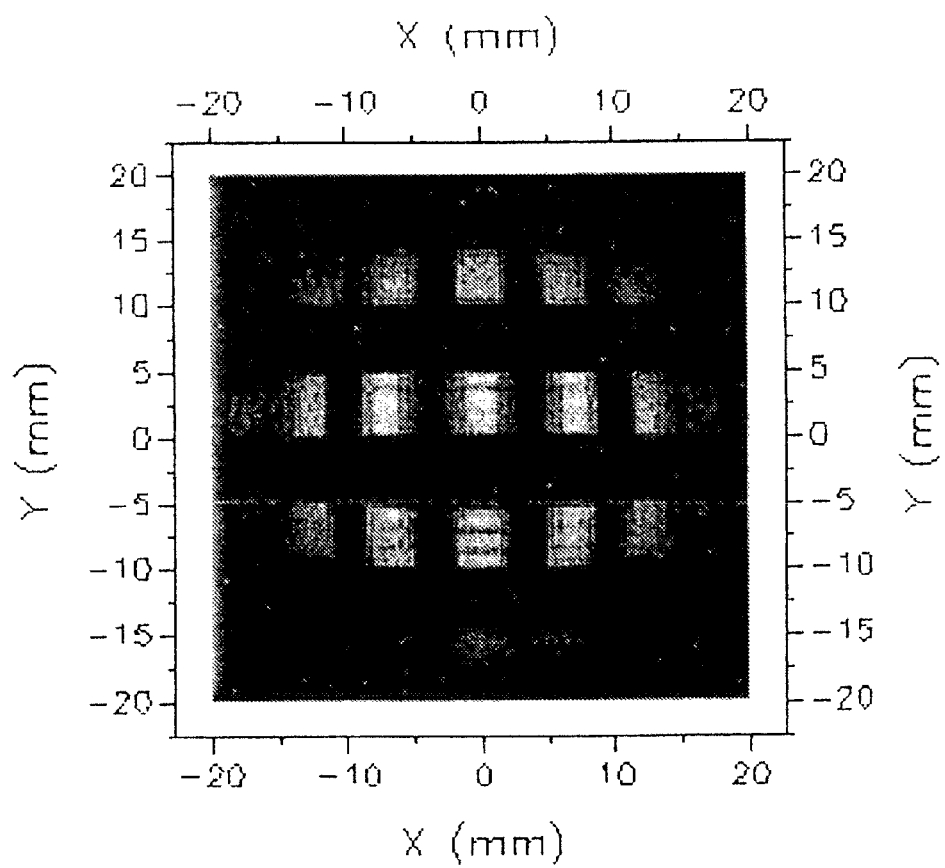
FIG. 6 shows a light intensity distribution of the separated luminous fluxes at a position of the reflecting element in the illuminating device shown in FIG. 1.

FIG. 6 shows a light intensity distribution of a separated luminous flux at the position of reflecting element 107. In FIG. 6, the Y axis corresponds to the vertical direction (up-and-down direction) shown in FIG. 5A, and the X axis corresponds to the horizontal direction (back-and-forth direction) shown in FIG. 5A. In the Y axis and the X axis, the position of the optical axis (optical axis A shown in FIG. 1) of the illuminating system is 0.

As shown in FIG. 6, at the position of reflecting element 107, the plurality of optical images (virtual images) of the exit surface of light guiding rod 103 is formed. Each optical image corresponds to each separated luminous flux, and has a width of about 5 millimeters in the vertical direction. In the vertical direction, the width of a region (region where no optical image is formed) between the optical images is also about 5 millimeters.

Reflecting element 107 includes belt-shaped reflecting films 21 to 24 shown in FIG. 4, which are arranged in spaces among the optical images (namely, spaces among the separated luminous fluxes) shown in FIG. 6. Specifically, reflecting films 21 to 24 are arranged in the four belt-shaped regions within a range of "−15" to "−10", a range of "−5" to "−0", a range of "5" to "10", and a range of "15" to "20" on the Y axis. It is preferable that reflecting films 21 to 24 be arranged not to overlap the optical images.

The number of reflecting films of reflecting element 107 and the width of each reflecting film are determined based on the number and diameters of separated luminous fluxes. The number and diameters of separated luminous fluxes are determined based on the size and length of light guiding rod 103, and the number of light reflecting times on the rod inner surface.

The luminous fluxes spatially separated by illumination lenses 104 to 106 pass through reflecting element 107. Reflecting film 107 is configured so that the luminous flux output from light guiding rod 103 can be sufficiently separated, and the reflecting surface can be located in a space of a small ray presence range. Hence, each separated luminous flux passes through reflecting element 107 and there are almost no obstacles to cause light loss such as shielding of light by reflecting element 107.

The separated luminous fluxes that passed through reflecting element 107 are superimposed (ray 51 shown in FIG. 5A) by illumination lenses 108 and 109. Ray 51 passes through phase plate 110 to reach reflective polarizing plate 111.

At reflective polarizing plate 111, of ray 51 (unpolarized light) that passed through phase plate 110, first linear polarized light (e.g., p-polarized light) is transmitted while second linear polarized light (e.g., s-polarized light) is reflected toward phase plate 110.

The first linear polarized light that passed through reflective polarizing plate 111 is applied to the display surface (panel surface) of display element 112. Illuminating display element 112 with the first linear polarized light of ray 51 superimposed by illumination lenses 108 and 109 enables illumination of a uniform illuminance distribution.

The second linear polarized light (s-polarized light) reflected by reflective polarizing plate 11 passes through phase plate 110, and is then magnified by illumination lenses 108 and 109 to illuminate reflecting films 21 to 24 of reflecting element 107.

Figure 7:
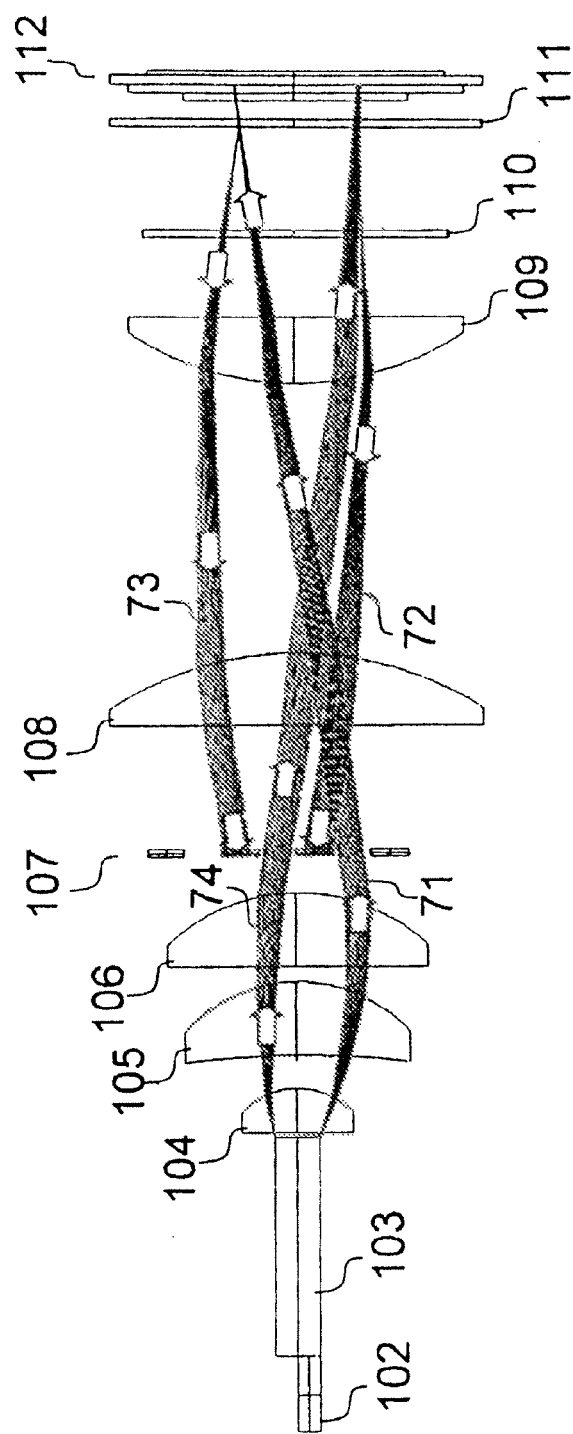
FIG. 7 schematically shows a ray path where the separated luminous flux output from an exit surface of the light guiding rod and separated by the illumination lens reaches a surface element and a ray path where light of a polarized component reflected by a reflective polarizing plate reaches the reflecting element in the illuminating device shown in FIG. 1.

FIG. 7 schematically shows a ray path where the separated luminous flux that is output from the exit surface of light guiding rod 103 and that is separated by illumination lens 104 to 106 reaches surface element 112 and a ray path where the light of the polarized component reflected by reflective polarizing plate 111 reaches reflecting element 107.

As shown in FIG. 7, separated luminous fluxes 71 and 74 that are output from the exit surface of light guiding rod 103 and that are separated by illumination lenses 104 to 106 pass through reflecting element 107. Separated luminous fluxes 71 and 74 passed through reflecting element 107 are condensed by illumination lenses 108 and 109, and then pass through phase plate 110 to reach reflective polarizing plate 111.

First linear polarized light (e.g., p-polarized light) of separated luminous fluxes 71 and 74 that passed through phase plate 110 passes through reflective polarizing plate 111 to reach display element 112. Second linear polarized light (e.g., s-polarized light) of separated luminous fluxes 71 and 74 from phase plate 110 is reflected by reflective polarizing plate 111.

The second linear polarized light (s-polarized light) of separated luminous flux 71, which has been reflected by reflective polarizing plate 111, passes through phase plate 110 to reach illumination lens 109 as luminous flux 73 (circular polarized light). Luminous flux 73 from phase plate 110 is enlarged by illumination lenses 108 and 109 to be applied to a reflecting film (corresponding to reflecting film 22 shown in FIG. 4) of reflecting element 107.

The second linear polarized light (s-polarized light) of separated luminous flux 74, which has been reflected by reflective polarizing plate 111, passes through phase plate 110 to reach illumination lens 109 as luminous flux 72 (circular polarized light). Luminous flux 72 from phase plate 110 is magnified by illumination lenses 108 and 109 to be applied to a reflecting film (corresponding to reflecting film 23 shown in FIG. 4) of reflecting element 107.

In the example shown in FIG. 7, only the ray paths for separated luminous fluxes 71 and 74 are shown. Similarly, in the case of other separated luminous fluxes, first linear polarized light (p-polarized light) passes through reflective polarizing plate 111, while second linear polarized light (s-polarized light) is reflected by reflective polarizing plate 111 to return to reflecting element 107.

Figure 8:
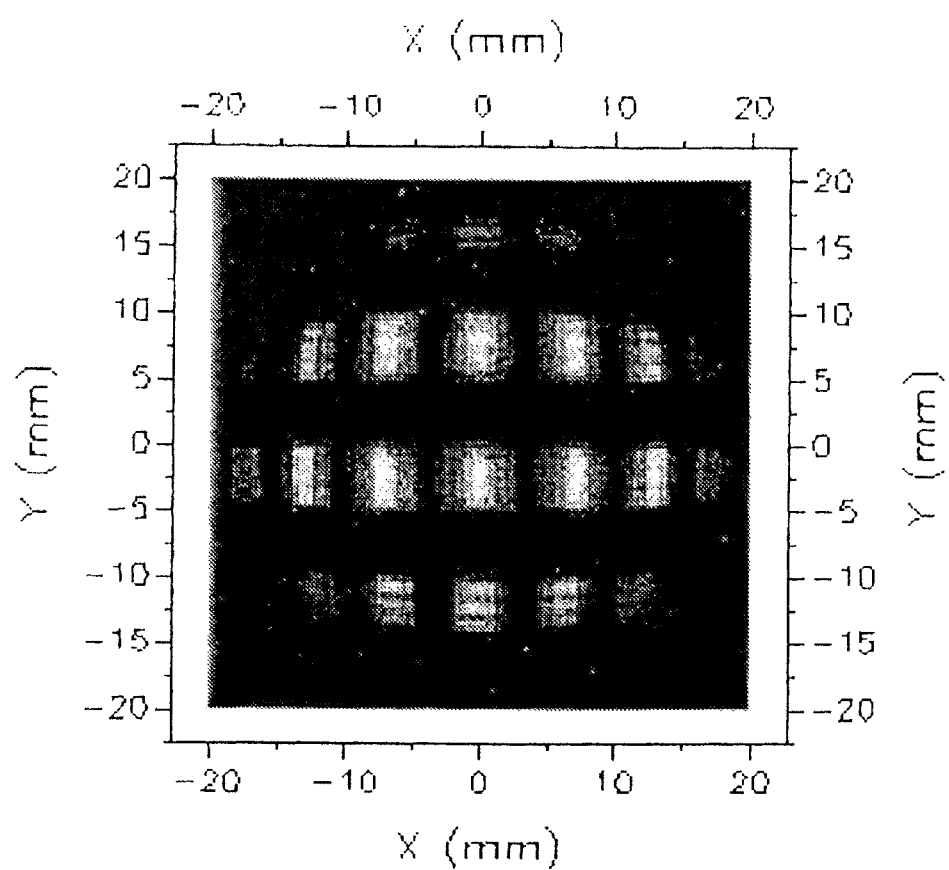
FIG. 8 shows a light intensity distribution of a luminous flux reflected by the reflective polarizing plate to return to the reflecting element among luminous fluxes spatially separated by the illumination lens in the illuminating device shown in FIG. 1.

FIG. 8 shows a light intensity distribution of, among the luminous fluxes spatially separated by illumination lenses 104 to 106, a separated luminous flux reflected by reflective polarizing plate 111 to return to reflecting element 107. In FIG. 8, the Y axis corresponds to the vertical direction (up-and-down direction) shown in FIG. 7, and the X axis corresponds to the horizontal direction (back-and-forth direction) shown in FIG. 7. In the Y axis and the X axis, the position of the optical axis (optical axis A shown in FIG. 1) of the illuminating system is 0.

As shown in FIG. 8, at the position of reflecting element 107, a plurality of optical images (virtual images) of an image (image corresponding to the optical image on the exit surface of light guiding rod 103) formed on reflective polarizing plate 111 by the second linear polarized light is formed. Each optical image has a width of about 5 millimeters in the vertical direction. In the vertical direction, the width of a region (region where no optical image is formed) between the optical images is also about 5 millimeters.

In the example shown in FIG. 8, at the position of reflecting element 107, relatively clear rectangular optical images are formed. Hence, a state where the light reflected by reflective polarizing plate 111 efficiently reaches the reflecting film of reflecting element 107 can be confirmed.

Each optical image shown in FIG. 8 corresponds to each optical image shown in FIG. 6. However, the position of the optical image is shifted in the vertical direction with respect to that of each optical image shown in FIG. 6. In other words, each optical image shown in FIG. 8 is formed on each reflecting film of reflecting element 107. Thus, most of the light which is reflected by reflective polarizing plate 111 to return to reflecting element 107 is reflected on each reflecting film of reflecting element 107 toward reflective polarizing plate 111.

The luminous flux (circular polarized light) reflected on each reflecting film of reflecting element 107 is condensed by illumination lenses 108 and 109, and then passes through phase plate 110 to reach reflective polarizing plate 111. The luminous flux (circular polarized light) from each reflecting film of reflecting element 107 is converted into first polarized light (p-polarized light) at phase plate 110. The first polarized light (p-polarized light) from phase plate 110 is transmitted through reflective polarizing plate 111 to reach display element 112.

Figure 9:
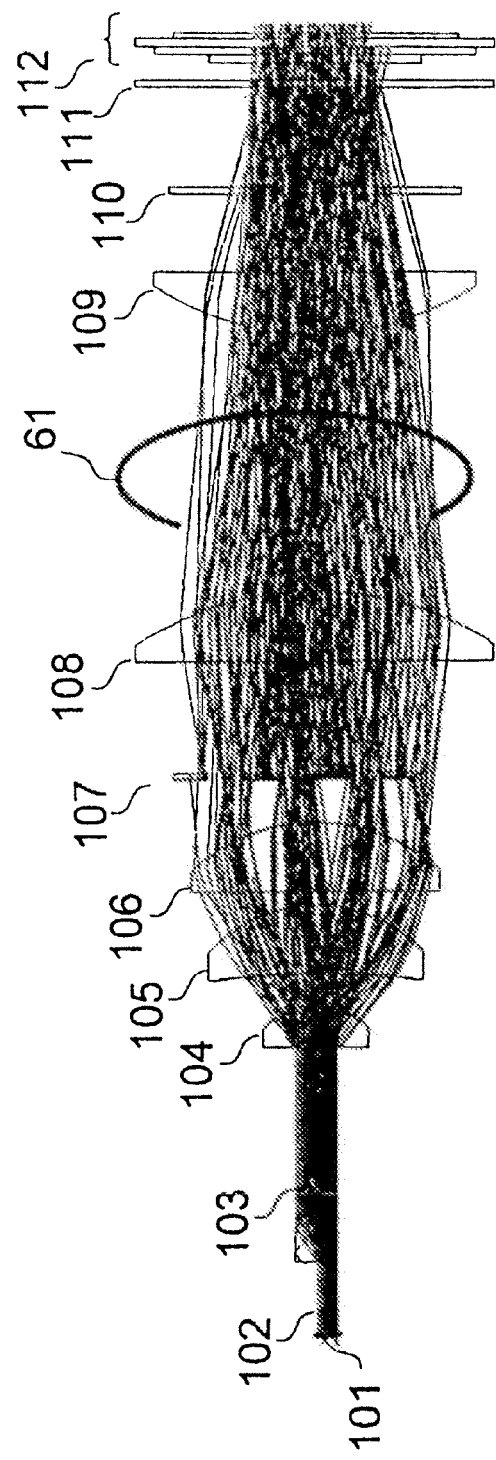
FIG. 9 is a schematic view showing a result of ray-tracing a process where the luminous flux from the light source reaches the display element, a process where the light reflected by the reflective polarizing plate reaches the reflecting element, and a process where light reflected by the reflecting element reaches display element 112 in the illuminating device shown in FIG. 1.

FIG. 9 shows the result of ray-tracing a process where the luminous flux from light source 191 reaches display element 121, a process where the light reflected by reflective polarizing plate 111 reaches reflecting element 107, and a process where light reflected by reflecting element 107 reaches display element 112.

As shown in FIG. 9, the first polarized light of each of the luminous fluxes that are spatially separated by illumination lenses 104 to 106 and that are passed through reflecting element 107 is transmitted through reflective polarizing plate 111 to be applied to display element 112. The second polarized light of each separated luminous flux is reflected by reflective polarizing plate 111, converted into circular polarized light by phase plate 110, and then applied to each reflecting film of reflecting element 107 by illumination lenses 108 and 109. The light (circular polarized light), which is reflected by each reflecting film of reflecting element 107, is converted into second polarized light by phase plate 110, and then transmitted through reflective polarizing plate 111 to be applied to display element 112. Most of the light of the polarized component reflected by reflecting polarizing plate 111 is accordingly used as light to illuminate display element 112. Thus, light use efficiency can be increased.

As described above, according to the present embodiment, the illumination device can use the light of the polarized component reflected by reflective polarizing plate 111 as illumination light. As a result, light use efficiency can be increased.

Reflecting element 107 is formed into a structure that includes transmission regions for transmitting the spatially separated luminous fluxes and a reflecting film formed in a region other than the transmission regions to reflect the light from the reflective polarizing plate. The reflecting film can be formed by deposition, and hence a pitch between the transmission region and the reflecting film can be easily set to about 1 millimeter. Thus, the problem of achieving miniaturization that is difficult in the PBS polarizing conversion can be solved, and the illuminating device can be miniaturized.

Each reflecting film of reflecting element 107 is located in the space between the luminous fluxes spatially separated by illumination lenses 104 to 106, and hence most of the separated luminous fluxes pass through reflecting element 107. Thus, light use efficiency can be further increased.

The center axis of light guiding rod 103 matches the optical axis of the illumination lens group including illumination lenses 104 to 106, 108, and 109. The light from light source 101 enters, via light guiding rod 102, one of the two regions of the incident surface of light guiding rod 103, the two regions being divided by the straight line that passes through the center (center of gravity) of the incident surface. According to this configuration, the optical image, which is shown in FIG. 6 and which is formed based on the luminous flux incident from light guiding rod 103 via illumination lenses 104 to 106, can be accurately formed in a region other than the reflecting film of reflecting element 107, and the optical image, which is shown in FIG. 8 and which is formed based on the light incident from reflective polarizing plate 111 via phase plate 110 and illumination lenses 108 and 109, can be accurately formed on the reflecting film. Thus, light use efficiency can be further increased.

The incident surface of light guiding rod 102 is set equal in size to the light emitting part of light source (LED) 101. Hence, enlargement of light guiding rods 102 and 103 can be prevented, and simultaneously the amount of light of the light source (LED) to be captured can be secured. When the area of the incident surface of light guiding rod 101 is set larger than the light emitting area of the LED, the amount of light to be captured increases. However, light guiding rods 102 and 103 are enlarged, and the entire optical system such as the illumination lenses is also enlarged. In addition, in the illumination system that forms an image of the exit surface of light guiding surface 103 on the liquid crystal panel, enlargement of the light guiding rod causes reduction of light use efficiency.

In the illuminating device according to the present embodiment, for example, when the luminance distribution of the light flux from light source 101 is almost uniform on a surface that is orthogonal to its optical axis, light guiding rod 102 is unnecessary. In this case, the light emitting part of light source 101 is located close to one end surface of light guiding rod 103 that is larger in area than the light emitting part. Also in this case, the light from the light emitting part enters one of the two regions divided by the straight line passing through the center (center of gravity) of the incident surface of light guiding rod 103.

As shown in FIG. 4, the reflecting film of reflecting element 107 is belt-shaped. However, the reflecting film is not limited to this shape. Reflecting element 107 can include a reflecting film only in the region shown in FIG. 8 where the optical image is formed.

As long as the luminous flux from light guiding rod 103 passes through reflecting element 107, and at least a part of the light from reflective polarizing plate 111 is reflected toward reflective polarizing plate 111 by reflecting element 107, reflecting element 107 can be disposed in any position of the illumination lens group. However, depending on the position of reflecting element 107, the ratio of the amount of light returned to reflective polarizing plate 111 with respect to the amount of light from reflective polarizing plate 111 decreases, thereby reducing the light use efficiency improvement effect by one half. It is preferable that reflecting element 107 be located so that the light from light guiding rod 103 can be sufficiently separated spatially by the illumination lenses and so that the width of the region between the separated luminous fluxes can be equal to or more than the width of the separated luminous flux. Thus, the light use efficiency improvement effect can be exhibited to the maximum.

In the configuration shown in FIG. 1, the surface of illumination lens 109 on display element 112 side is a plane, and phase plate 110 is stuck to this plane. However, phase plate 110 can be provided separately from the illumination lens. However, the configuration where phase plate 110 is stuck to illumination lens 109 enables common use of the glass substrate, and hence the number of components can be reduced.

Figure 10:
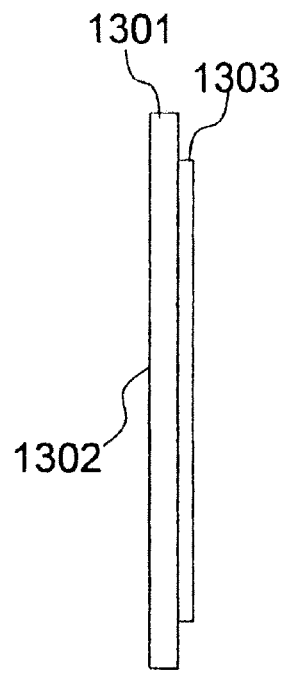
FIG. 10 is a schematic view showing examples of a phase plate and the reflecting element included in the illuminating device shown in FIG. 1.

Phase plate 110 can be formed integrally with reflecting element 107. For example, as shown in FIG. 10, a striped reflecting surface is deposited on one surface 1302 (light source 101 side) of glass substrate 1301, and phase plate 1303 is stuck to its rear surface (display element 112 side). This configuration can also reduce the number of components.

Light source 101 can be a light source other than the LED. For example, a lamp using arc discharging can be used as light source 101. In this case, a condenser lens for entering light from the lamp to the incident surface of the light guiding rod is used.

The illumination lens group includes five illumination lenses 104, 105, 106, 108, and 109. However, the illumination lens group is not limited to these. Illumination lenses 108 and 109 can be removed from the illumination lens group. In this case, optical parameters (curvature radius and interval) of illumination lenses 104 to 106 are set to enable formation of the optical image formed on the exit surface of light guiding rod 103 on the display surface of display element 112, to enable spatial separation of the luminous flux from the exit surface of light guiding rod 103, and to enable returning, at the separation position of the luminous fluxes, of reflected light from reflective polarizing plate 111 to a region between the separated luminous fluxes. Reflecting element 107 is located between illumination lens 106 and phase plate 110.

Second Exemplary Embodiment

According to the first exemplary embodiment, as means for causing light enter light guiding rod 103, a set of light source 101 and light guiding rod 102 is used. However, another set of a light source and a light guiding rod can be added. A second exemplary embodiment of the present invention is directed to a case where a plurality of means, each including light sources and light guiding rods, is provided as means for causing light enter light guiding rod 103.

Figure 11:
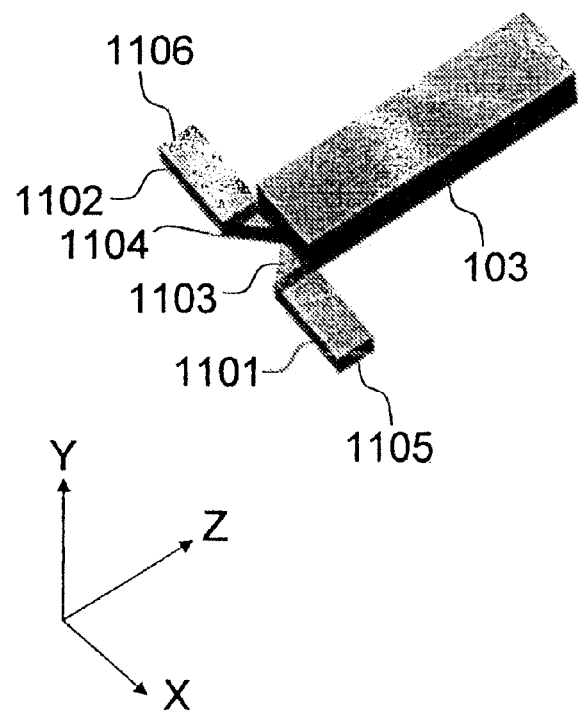
FIG. 11 is a schematic view showing a configuration of light source means of an illuminating device according to a second exemplary embodiment of the present invention.

An illuminating device according to the present embodiment is similar in configuration to that of the first embodiment except for inclusion of two light source means for causing light enter light guiding rod 103. FIG. 11 shows a configuration of the light source means for causing light enter light guiding rod 103.

As shown in FIG. 11, the illuminating device according to the present embodiment includes two light guiding rods 1101 and 1102 as means for causing light enter light guiding rod 103.

Light guiding rod 1101 includes, at one end, incident surface 1105 into which light from a light source not-shown (e.g., LED) enters. The light incident from incidence surface 1105 is propagated inside to exit from an end surface of the other end. The configuration of the light source and light guiding rod 1101 corresponds to that of light source 101 and light guiding rod 102 shown in FIG. 1.

Prism 1103 for bending the optical path of the light output from the end surface by 90 degrees is located on the end surface of the other end of light guiding rod 1101. Light guiding rod 1101 and prism 1103 can be integrally formed. Prism 1103 can be formed as a part of light guiding rod 1101.

Light guiding rod 1102 includes, at one end, incident surface 1106 into which light from another light source not-shown (e.g., LED) enters. The light incident from incidence surface 1106 is propagated inside to exit from an end surface of the other end. The configuration of another light source and light guiding rod 1102 corresponds to that of light source 101 and light guiding rod 102 shown in FIG. 1.

Prism 1104 for bending the optical path of the light output from the end surface by 90 degrees is located on the end surface of the other end of light guiding rod 1102. Light guiding rod 1102 and prism 1104 can be integrally formed. Prism 1104 can be formed as a part of light guiding rod 1102.

The exit surfaces of prisms 1103 and 1104 are optically coupled into one (lower region shown in FIG. 5A) of two regions of the incident surface of light guiding rod 103, the two regions being divided by a straight line that passes through the center of the incident surface.

The light sources located on incident surfaces 105 and 106 have peak wavelengths in a wavelength band of the same color.

Figure 12A:
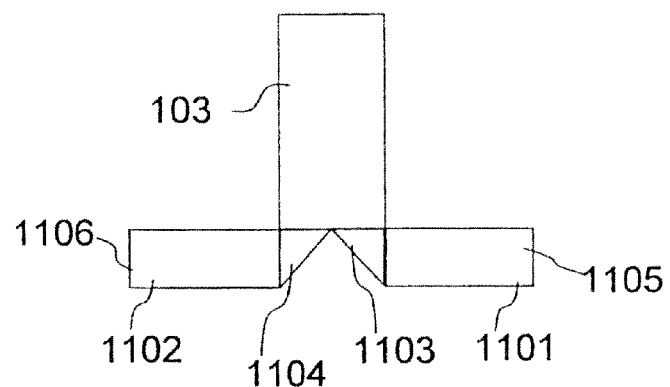
FIG. 12A is a top view showing the light source means shown in FIG. 11.
Figure 12B:
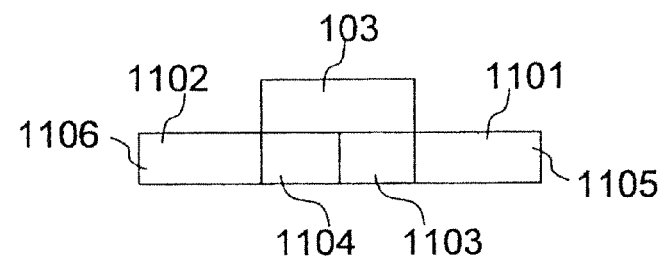
FIG. 12B is a side view showing the light source means shown in FIG. 11.
Figure 12C:
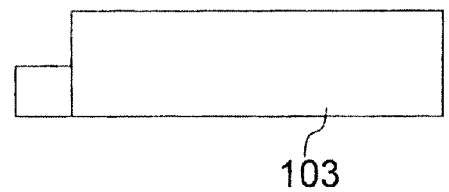
FIG. 12C is a front view showing the light source means shown in FIG. 11.

FIG. 12A is a schematic view when the configuration shown in FIG. 11 is seen from the Y direction. FIG. 12B is a schematic view when the configuration shown in FIG. 11 is seen from the X direction. FIG. 12C is a schematic view when the configuration shown in FIG. 11 is seen from the Z direction.

As shown in FIG. 12A, when seen from the Y direction, light guiding rods 103, 1101, and 1102 are coupled into a T shape. As shown in FIG. 12B and FIG. 12C, light guiding rods 1102 and 1102 are coupled to the lower half region of the incident surface of light guiding rod 103 by prisms 1103 and 1104.

A light emitting center of the light source located on incidence surface 106 of light guiding rod 1101 is located on the center axis of light guiding rod 1101, while the center (corresponding to the light emitting center) of the light source image formed on the exit surface of prism 1103 is not located on the optical axis (optical axis A shown in FIG. 1) of the illuminating system including light guiding rod 103 and the illumination lens group.

A light emitting center of the light source located on incidence surface 106 of light guiding rod 1102 is located on the center axis of light guiding rod 1101, while the center (corresponding to the light emitting center) of the light source image formed on the exit surface of prism 1103 is not located on the optical axis (optical axis A shown in FIG. 1) of the illuminating system including light guiding rod 103 and the illumination lens group.

For light guiding rods 1101 and 1102, for example, light guiding rods having sectional sizes of 3 mm×4 mm and lengths of 10 millimeters are used. For light guiding rod 103, for example, a light guiding rod having a sectional size of 6 mm×8 mm and a length of 30 millimeters is used The illuminating device according to the present embodiment can provide the same operation effects as those of the illuminating device according to the first exemplary embodiment, and can achieve high luminance by using the two light sources.

The light guiding means shown in FIG. 11 is only an example. The present invention is not limited to the shown configuration. For example, three or more light source means, each including light sources, light guiding rods, and prisms, can be provided. In this case, each light source means is optically coupled into one of two regions of the incident surface of light guiding rod 103, the two regions being divided by a straight line that passes through the center (center of gravity) of the incident surface.

Light guiding rods 103, 1101, and 1102 can be coupled into a shape other than a T shape. For example, a coupling form based on a combination of light guiding rod 102 shown in FIG. 1 and light guiding rod 1101 shown in FIG. 11 can be used.

Another Exemplary Embodiment

Figure 13:
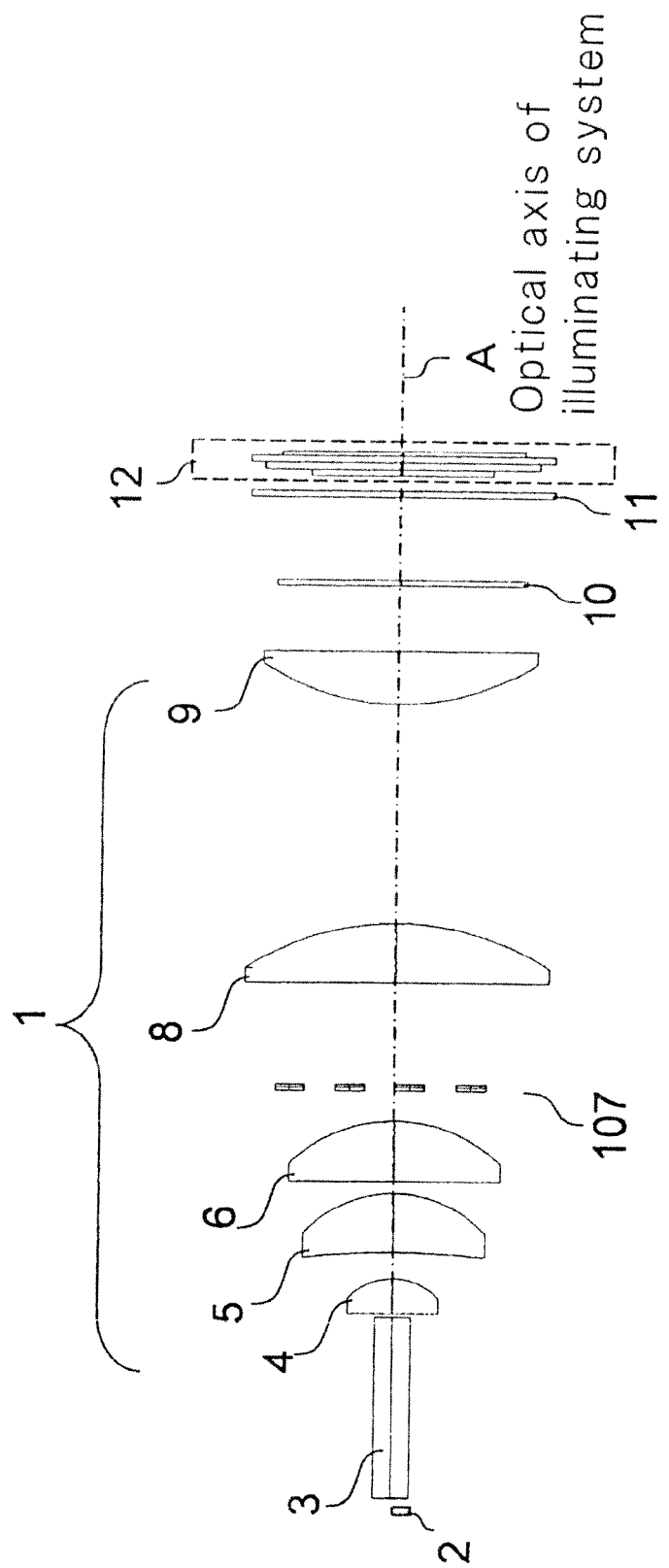
FIG. 13 is a schematic view showing a configuration of an illuminating device according to another exemplary embodiment of the present invention.

FIG. 13 shows a configuration of an illuminating device according to another exemplary embodiment of the present invention.

Referring to FIG. 13, the illuminating device according to the present embodiment includes illuminating optical system 1, light source 2, light guiding means 3, reflecting element 7, phase plate 10, and reflective polarizing plate 11.

Light guiding means 3 is configured so that light incident from one end surface can be propagated inside to exit from the other end surface. Light from light source 2 enters one end surface of light guiding means 3. Illuminating optical system 1 includes illumination lenses 4 to 6, 8, and 9 for forming an optical image formed on the other end surface of light guiding means 3 on display element 12, and is configured so that a luminous flux from light guiding means 3 can be spatially separated into a plurality of luminous fluxes by at least one lens.

Reflective polarizing plate 11 is located between illuminating optical system 1 and display element 12. Reflective polarizing plate 11 transmits first polarized light while reflecting second polarized light that is different in polarized state from the first polarized light toward illuminating optical system 1.

Reflecting element 7, which is disposed at a position where the plurality of luminous fluxes are spatially separated, reflects light reflected by reflective polarizing plate 11 toward reflective polarizing plate 11. Reflecting element 7 includes transmission regions through which the plurality of luminous fluxes are transmitted, and a reflecting film which is formed in a region other than the transmission regions and which reflects the light from reflective polarizing plate 11.

Phase plate 10 is located between reflecting element 7 and reflective polarizing plate 11.

According to the illuminating device of the present embodiment, since reflecting the light of a polarized component reflected by reflective polarizing plate 11 toward reflective polarizing plate 11 by reflecting element 7, reflected light from reflective polarizing plate 11 can be used as illumination light. As a result, light use efficiency can be increased.

Reflecting element 107 is formed into a structure that includes transmission regions, through which the spatially separated luminous fluxes are transmitted, and the reflecting film which is formed in a region other than the transmission regions. The reflecting film can be formed by deposition, and hence the pitch between the transmission region and the reflecting region can be easily set to about 1 millimeter. Thus, the problem of achieving miniaturization that is difficult in the PBS polarizing conversion can be solved, and the illuminating device can be miniaturized.

The illuminating device according to the present embodiment can be configured so that the light emitting center of light source 2 is not located on the optical axis (optical axis A) of the entire system including light guiding means 3 and illuminating optical system 1. According to this configuration, by appropriately setting a shifting amount of the light emitting center of light source 2 with the optical axis A, the reflected light from reflective polarizing plate 11 can be accurately condensed in the reflecting region of reflecting element 7.

Depending on the shifting amount of light source 2 with respect to the optical axis A, a part of the reflected light from reflective polarizing plate 11 is reflected by reflecting element 7, while the rest is transmitted through reflecting element 7. The light transmitted through reflecting element 7 returns to light source 2. A part of the light returned to light source 2 is reflected on the surface of light source 2 toward reflecting element 7. This reflected light can be used as illumination light.

Depending on the position of reflecting element 7, a part of the reflected light from reflective polarizing plate 11 is reflected by reflecting element 7, while the rest is transmitted through reflecting element 7. In this case, as in the abovementioned case, a part of the light returned to light source 2 can be used as illumination light.

Next, a configuration of a projection display device that uses the illumination device of the present invention is described.

FIG. 14 shows the configuration of the projection display device that includes the illumination device of the present invention.

The projection display device shown in FIG. 14 is a three-plate liquid crystal projector, a main portion of which includes illuminating devices 200 to 202, projection optical system 203, liquid crystal panels 204 to 206, and cross dichroic prism 207.

Illuminating devices 200 to 202 are similar in configuration to the illuminating device according to the first exemplary embodiment. For a light source of illuminating device 200, a light source that has a peak wavelength in a blue wavelength band is used. For a light source of illuminating device 201, a light source that has a peak wavelength in a red wavelength band is used. For a light source of illuminating device 202, a light source that has a peak wavelength in a green wavelength band is used. The blue, green, and red colors correspond to three primary colors of light.

Liquid crystal panel 204 is illuminated with color light (blue) of predetermined polarized light (p or s-polarized light) output from illuminating device 200. Liquid crystal panel 205 is illuminated with color light (red) of predetermined polarized light (p or s-polarized light) output from illuminating device 201. Liquid crystal panel 206 is illuminated with color light (green) of predetermined polarized light (p or s-polarized light) output from illuminating device 202.

Cross dichroic prism 207 is located at an intersection point of optical axes of illuminating devices 200 to 202. Cross dichroic prism 207 includes a first incident surface into which image light (blue) from liquid crystal panel 204 enters, a second incident surface into which image light (red) from liquid crystal panel 205 enters, a third incident surface into which image light (green) from liquid crystal panel 206 enters, and an exit surface from which color synthesized image light, which is obtained by synthesizing colors of the image lights (red, green, and blue) incident from the incident surfaces, exit.

Projection optical system 203 projects the color synthesized image light from cross dichroic prism 207 on a screen (not shown). A pupil of projection optical system 203 is set in a focal position of each of the optical systems (illumination lenses 104 to 106, 108, and 109) of illuminating lenses 200 to 202. In other words, the optical system of each of illuminating devices 200 to 202 and projection optical system 203 constitute a telecentric system.

According to the projection display device of the present embodiment, each illuminating device illuminates each liquid crystal panel with highly efficient illumination light. Thus, a bright projected image can be acquired.

For illuminating devices 200 to 202, the illuminating devices according to the second embodiment and the other embodiment can be used.

The illuminating device of the present invention can be applied to a single-plate liquid crystal projector. A main portion of the single-plate liquid crystal projector includes an illuminating device, a liquid crystal panel illuminated with light from the illuminating device, and a projection optical system that projects image light from the liquid crystal panel onto a screen. For example, each pixel of the liquid crystal panel includes a color filter of red, green, or blue. This enables full-color displaying. In this case, a displaying/nondisplaying operation at each pixel is carried out in time division for each color.

The illuminating device and the projection display device described above are only examples of the present invention. The configuration and operation of the present invention is open to various modifications within a scope that does not depart from the gist of the present invention.

The invention claimed is:

1. An illuminating device comprising:
    a first light source;
    a first light guiding unit where light from the first light source is supplied to one end surface, and light incident from the one end surface is propagated inside to exit from the other end surface;
    an illuminating optical system that spatially separates a luminous flux output from the other end surface of the first light guiding unit into a plurality of luminous fluxes and that forms, on a display element, an optical image that is formed on the other end surface of the first light guiding unit;

a reflective polarizing plate that is located between the illuminating optical system and the display element and that transmits first polarized light while reflecting second polarized light different in polarized state from the first polarized light toward the illuminating optical system;

a reflecting element that is disposed at a position where the plurality of luminous fluxes are spatially separated, on an optical path between the first light guiding unit and the reflective polarizing plate and that reflects light reflected by the reflective polarizing plate toward the reflective polarizing plate; and a phase plate that is located between the reflecting element and the reflective polarizing plate, wherein the reflecting element includes transmission regions through which the plurality of luminous fluxes are transmitted, and a reflecting film that is formed in a region other than the transmission regions to reflect the light from the reflective polarizing plate.

2. The illuminating device according to claim 1, wherein a light emitting center of the first light source is not located on an optical axis of an entire system including the first light guiding unit and the illuminating optical system.

3. The illuminating device according to claim 2, further comprising a second light guiding unit that is located between the first light source and the first light guiding unit, where the light from the first light source enters from one end surface, and the incident light is propagated inside to exit from the other end surface, wherein the light output from the other end surface of the second light guiding unit enters one of two regions of the one end surface of the first light guiding unit, the two regions being divided by a straight line that passes through a center of gravity of the one end surface.

4. The illuminating device according to claim 3, wherein the other end surface of the second light guiding unit is optically coupled with the one region of the one end surface of the first light guiding unit.

5. The illuminating device according to claim 3, wherein the first light source comprises a solid light source including a rectangular light emitting part, and an area of the light emitting part is equal to that of one end surface of the second light guiding unit.

6. The illuminating device according to claim 3, further comprising:

at least one second light source; and at least one third light guiding unit where light from the second light source enters from one end surface, and the incident light is propagated inside to exit from the other end surface, wherein the other end surfaces of the second light guiding unit and the third light guiding unit are optically coupled with the one region of the one end surface of the first light guiding unit.

7. The illuminating device according to claim 3, wherein the first light source comprises a LED, and the first light guiding unit is longer than the second light guiding unit.

8. The illuminating device according to claim 1, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

9. The illuminating device according to claim 1, wherein the illuminating optical system includes a lens that forms, on the reflecting film of the reflecting element, an optical image based on reflected light from the reflective polarizing conversion element.

10. The illuminating device according to claim 1, wherein a width of the reflecting film is equal to or more than the widths of the transmission regions.

11. A projection display device comprising:

an illuminating device;

a display element that is illuminated with light from the illuminating device; and a projection optical system that projects image light from the display element, wherein the illuminating device includes:

a light source;

a light guiding unit where light from the light source is supplied to one end surface, and light incident from the one end surface is propagated inside to exit from the other end surface;

an illuminating optical system that spatially separates a luminous flux output from the other end surface of the light guiding unit into a plurality of luminous fluxes and that forms, on the display element, an optical image that is formed on the other end surface of the light guiding unit;

a reflective polarizing plate that is located between the illuminating optical system and the display element and that transmits first polarized light while reflecting second polarized light different in polarized state from the first polarized light toward the illuminating optical system;

a reflecting element that is disposed at a position where the plurality of luminous fluxes are spatially separated, on an optical path between the first light guiding unit and the reflective polarizing plate and that reflects light reflected by the reflective polarizing plate toward the reflective polarizing plate; and a phase plate that is located between the reflecting element and the reflective polarizing plate;

and wherein the reflecting element includes transmission regions through which the plurality of luminous fluxes are transmitted, and a reflecting film that is formed in a region other than the transmission regions to reflect the light from the reflective polarizing plate.

12. The illuminating device according to claim 2, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

13. The illuminating device according to claim 3, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

14. The illuminating device according to claim 4, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

15. The illuminating device according to claim 5, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

16. The illuminating device according to claim 6, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

17. The illuminating device according to claim 7, wherein the reflecting film is formed into a striped shape and, when seen from a direction vertical to a surface of the reflecting element, a longitudinal direction of the reflecting film intersects a shifting direction of the light emitting center of the first light source from an optical axis of the entire system.

18. The illuminating device according to claim 2, wherein the illuminating optical system includes a lens that forms, on the reflecting film of the reflecting element, an optical image based on reflected light from the reflective polarizing conversion element.

19. The illuminating device according to claim 3, wherein the illuminating optical system includes a lens that forms, on the reflecting film of the reflecting element, an optical image based on reflected light from the reflective polarizing conversion element.

20. The illuminating device according to claim 4, wherein the illuminating optical system includes a lens that forms, on the reflecting film of the reflecting element, an optical image based on reflected light from the reflective polarizing conversion element.

* * * * *